(12) United States Patent
Shoji (10) Patent No.: US 9,079,546 B2
(45) Date of Patent: Jul. 14, 2015

(54) VEHICLE-MOUNTED INFORMATION APPARATUS

(75) Inventor: Masakazu Shoji, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 315 days.

(21) Appl. No.: 13/820,363

(22) PCT Filed: Dec. 14, 2010

(86) PCT No.: PCT/JP2010/007257
§ 371 (c)(1),
(2), (4) Date: Mar. 1, 2013

(87) PCT Pub. No.: WO2012/081051
PCT Pub. Date: Jun. 21, 2012

(65) Prior Publication Data
US 2013/0154361 A1    Jun. 20, 2013

(51) Int. Cl.
*B60R 16/02*    (2006.01)
*H04B 1/08*    (2006.01)

(52) U.S. Cl.
CPC .............. *B60R 16/02* (2013.01); *H04B 1/082* (2013.01)

(58) Field of Classification Search
CPC ....... G06F 1/16; G06F 1/1637; G06F 1/1654; G06F 1/1684; H05K 5/02; H05K 5/0017; H05K 5/0026; H05K 5/0047; H05K 5/0065; H05K 5/0221; H05K 7/10; H05K 7/14; H04B 1/082; H04B 2001/084

USPC .......... 361/679.01, 679.02, 679.29, 752, 753, 361/785, 788; 312/7.2; 307/9.1
See application file for complete search history.

(56) References Cited

U.S. PATENT DOCUMENTS 7,733,659 B2* 6/2010 Snider et al. ................... 361/752
2006/0126274 A1* 6/2006 Iwano et al. ................... 361/600

FOREIGN PATENT DOCUMENTS

| JP | 63-97270 U | 6/1988 |
| JP | 6-30802 U | 4/1994 |
| JP | 2001-127445 A | 5/2001 |
| JP | 2003-76438 A | 3/2003 |
| JP | 2010-109277 A | 5/2010 |

* cited by examiner

*Primary Examiner* — Jayprakash N Ghandi
*Assistant Examiner* — Mukund G Patel
(74) *Attorney, Agent, or Firm* — Birch, Stewart, Kolasch & Birch, LLP (57) ABSTRACT

A main body chassis 101 in which a navigation side connector 109 is positioned and fixed, and a display part chassis 203 in which an LCD side connector 205 is positioned and fixed are positioned by abutting a pair of positioning bosses 116 of each of positioning parts 115a and 115b against both-shoulder portions 214 of each of positioning protruding pieces 211a and 211b, and are secured with screws; whether the navigation side connector 109 and the LCD side connector 205 are connected or not can be confirmed by presence or absence of a fitting between a fitting pawl 118 of the outer wall surface and a fitting hole 213.

3 Claims, 7 Drawing Sheets

VEHICLE-MOUNTED INFORMATION APPARATUS

TECHNICAL FIELD

The present invention relates to a vehicle-mounted information apparatus in which a design panel is assembled to a main body chassis and internal circuit boards are connected to each other by board-to-board connecting connectors.

BACKGROUND ART

In a conventional car navigation device, a design panel made of a resin to which an LCD (liquid crystal display) board is attached is positioned and fastened to a device main body chassis accommodating a navigation board on which an electronic circuit implementing a navigation function is mounted, and an electronic circuit implementing a display function of the LCD is mounted on the LCD board. However, since it is configured that the LCD board is not directly fixed to the design panel, but that the LCD board is held by a chassis fixed to the design panel, separate components such as chassis are interposed therebetween, so that a direct positioning of the LCD board and the navigation board is not performed; thus, the connectors of both the boards tend to be misaligned with each other.

On the other hand, in the above device, a transmission amount of information between the navigation board and the LCD board is large, and hence a large number of pins of a connecting connector for satisfying it are required. From a reason such that a pitch between the pins are narrowed with an increase in the number of pins, a movable region thereof allowable in terms of structure is also narrowed. With a narrow movable region, in the case where a misalignment between the connectors is caused by the accumulation of intersections between the components, and the like, a connection between the connectors becomes difficult or something, which may lower precision in device assembly. For this reason, conventionally, a B to B connector in which the number of pins is increased, whereas the movable region is narrowed, what is called a board-to-board connector, is unusable.

Under such circumstances, conventionally, it is configured such that even when the misalignment occurs, connectors can be connected with each other by using an FFC (Flexible Flat Cable) or an FPC (Flexible Printed Circuit) with a wide movable region and also with a large number of pins, (e.g., see Patent Document 1), or that the necessary number of pins are ensured in such a manner that a plurality of B to B connectors with a widened movable region by a reduced number of pins are used.

PRIOR ART DOCUMENTS

Patent Documents

Patent Document 1: Japanese Patent Application Laid-open No. 2001-127445

However, when the FFC or FPC is used, handling such as routing becomes complicated; thus, there is a problem such that assemblability thereof is degraded. Further, in an in-vehicle device required to be saved in space, it is difficult to ensure a space for mounting a plurality of connectors on a board.

Also, conventionally, a design panel of a resin member and a main body chassis of a sheet metal member are fastened to each other, and hence a component (such as a spring) for grounding a LCD board is separately required. In addition, in order to allow checking after assembly whether a connection between the connectors is established or not, it is necessary to dispose the connectors close to a wall surface of the main body chassis, and to open a hole for visual check in the main body chassis.

The present invention is made to solve the foregoing problems, and an object of the invention is to provide a vehicle-mounted information apparatus which is controlled in finished dimensions to be improved in assembly precision, and can use B to B connectors with a large number of pins and a narrow movable region.

Problems to be Solved by the Invention

A vehicle-mounted information apparatus of the present invention includes: a first chassis shaped like a box; a first circuit board positioned and fixed inside the first chassis; a second chassis shaped like a plate which is an internal component of a design panel that covers one surface of the first chassis, and which is secured to the first chassis; a second circuit board positioned and fixed at a surface of the second chassis facing the first chassis; a pair of board-to-board connectors mounted respectively at positions of the first circuit board and the second circuit board to face each other, when the first chassis and the second chassis are put in an assembled state; two bosses arranged protrusively on each of a pair of opposing outer wall surfaces of the first chassis; a pair of protrusive pieces protruding respectively from a pair of opposing side parts of the second chassis toward the first chassis side, such that the pieces are abutted against a pair of opposing outer wall surfaces of the first chassis, respectively, and also that corresponding protruding tip portions thereof are each inserted between the two bosses, so that both-shoulder portions formed at the corresponding protruding tip portion are latched on the two bosses, thereby performing a positioning between the first chassis and the second chassis; and a fixing part for fixing the protrusive pieces of the second chassis to the outer wall surfaces of the first chassis.

Effects of the Invention

In accordance with the invention, when the first and second chassis in which the first and second circuit boards each on which the board-to-board connector is mounted are fixed are positioned and fixed to each other, the number of interposed parts are minimized, so that an effect of finished dimensions of the parts can be reduced. As a result, an assembly precision between the chassis is enhanced, which allows to use the board-to-board connector with a large number of pins and a narrow movable region.

BRIEF DESCRIPTION OF THE DRAWINGS

FIG. 9 illustrates an enlarged view of a positioning part of the main body chassis and a positioning protrusive piece of the display part chassis: FIG. 9(a) shows a state before assembly; and FIG. 9(b) shows a state after assembly.

BEST MODE FOR CARRYING OUT THE INVENTION

In the following, in order to explain the present invention in more detail, embodiments for carrying out the invention will be discussed with reference to the accompanying drawings. Embodiment 1.

Figure 1:
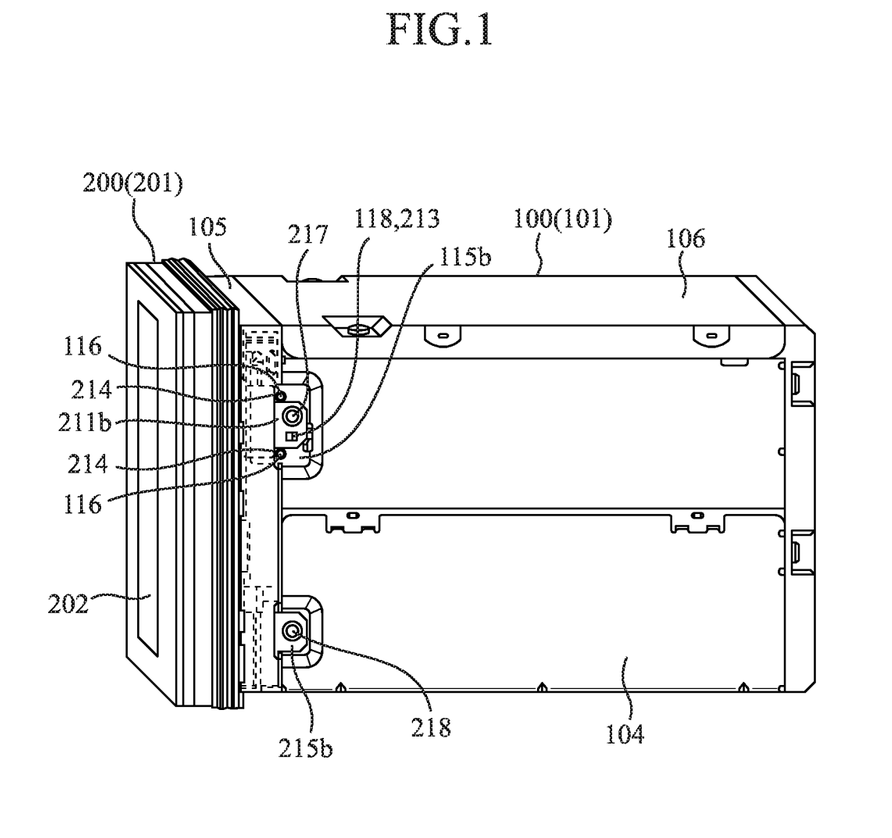
FIG. 1 is an external perspective view showing a configuration of a vehicle-mounted information apparatus in accordance with Embodiment 1 of the present invention.

A vehicle-mounted information apparatus shown in FIG. 1 is a car navigation device, a car audio device, and the like. The vehicle-mounted information apparatus includes a device main body 100 accommodating interiorly a navigation board having a navigation function (or an audio function, and the like), and a display part 200 accommodating interiorly a LCD board having a display function of a LCD 202 to be assembled thereinto.

First, a description will be given to a configuration of the device main body 100.

Figure 2:
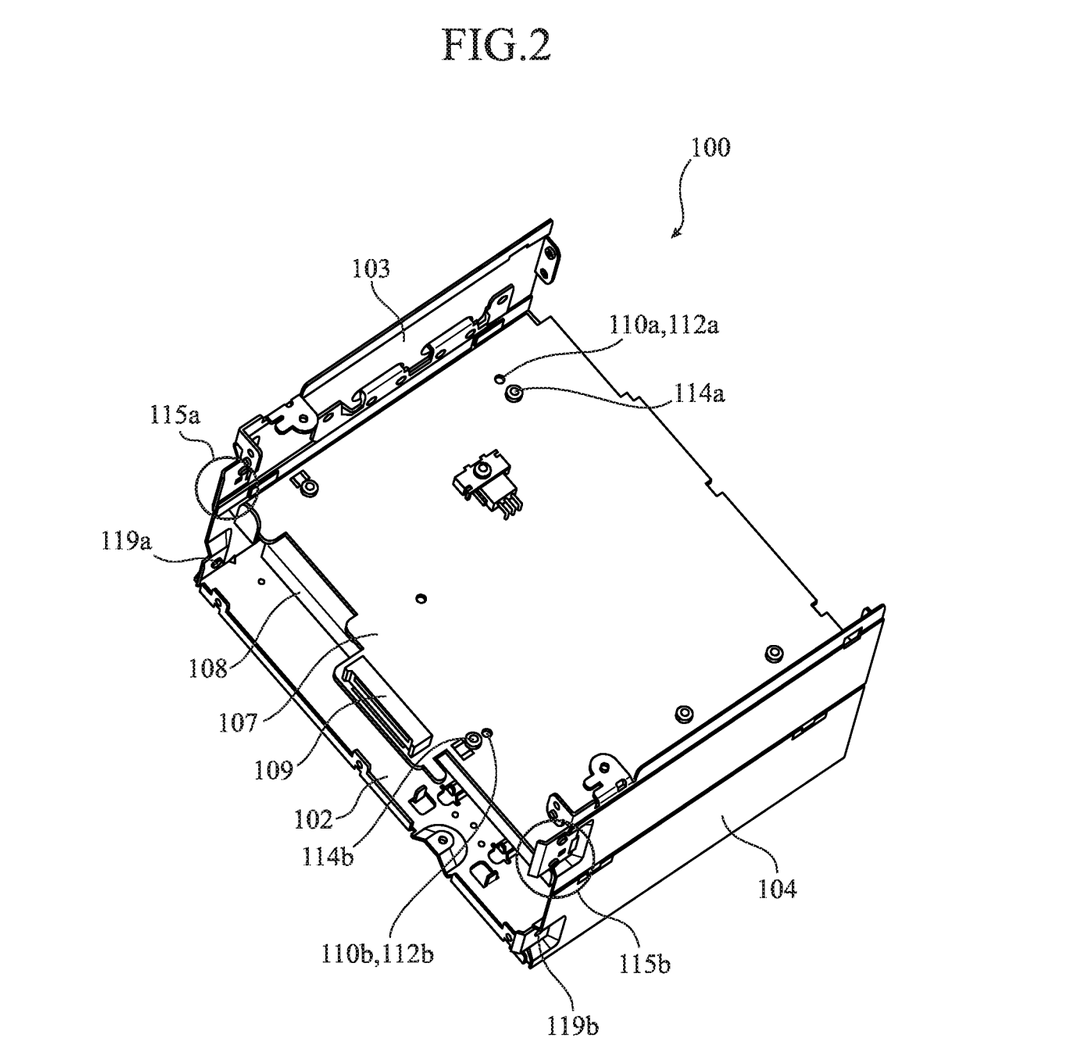
FIG. 2 is an external perspective view of a device main body in accordance with Embodiment 1, and shows a state after mounting of a navigation board.
Figure 3:
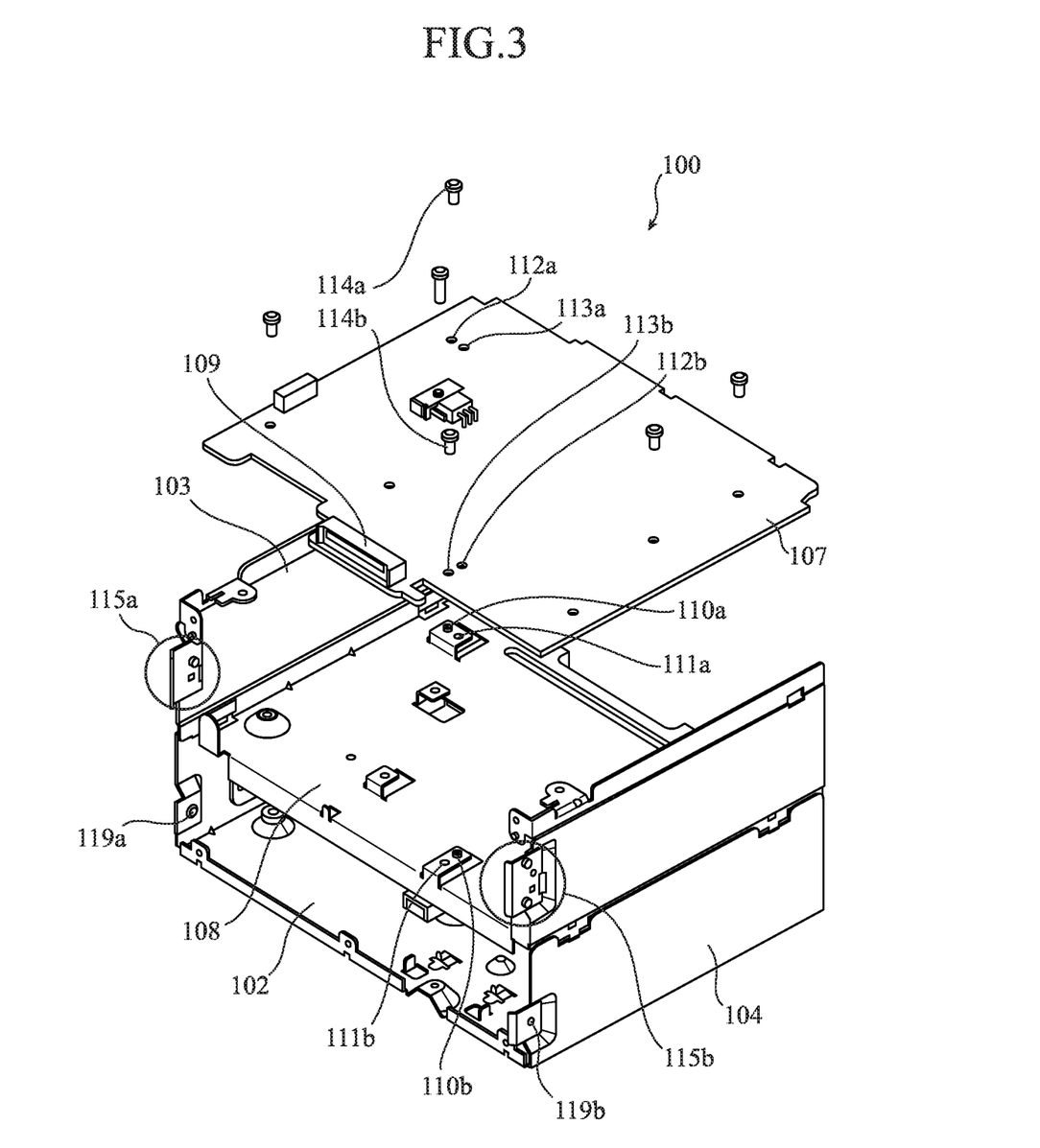
FIG. 3 is an external perspective view of the device main body in accordance with Embodiment 1, and shows a state before mounting of the navigation board.
Figure 4:
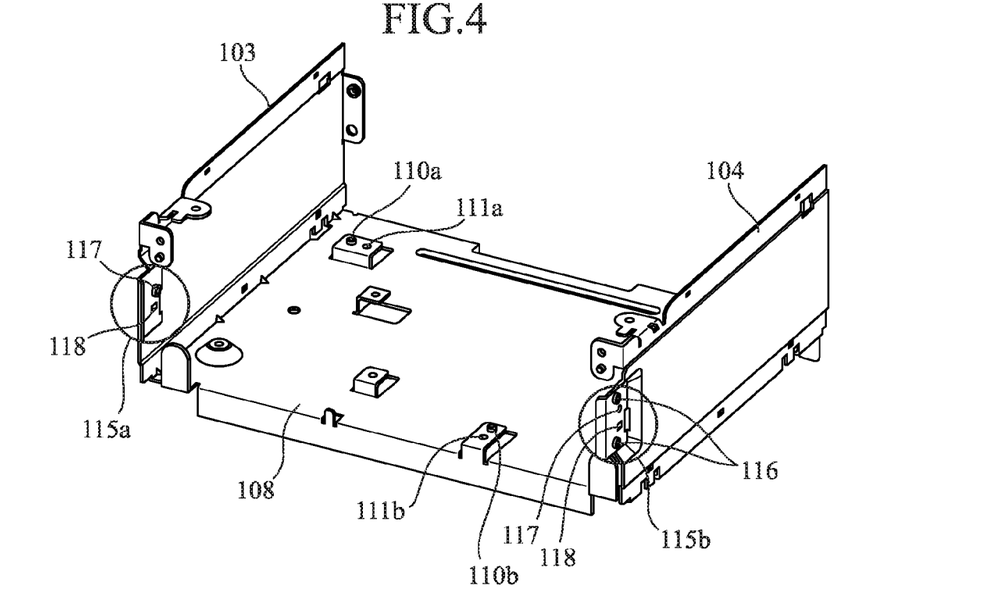
FIG. 4 is an external perspective view of a navigation board holder in accordance with Embodiment 1.

FIGS. 2 and 3 are each an external perspective view showing a configuration of the device main body 100: FIG. 2 shows a state after mounting of a navigation board 107; and FIG. 3 shows a state before mounting thereof. FIG. 4 is an external perspective view showing a configuration of a navigation board holder 108 for fixing the navigation board 107 thereon.

A main body chassis 101 of a sheet metal member forming the device main body 100 includes a bottom face 102, both side faces 103 and 104, a front face 105 (shown in FIG. 1), a top face 106 (shown in FIG. 1), and a back face (omitted in FIGS. 1 to 4). The navigation board holder 108 is fixed to an inner wall surface of the main body chassis 101 shaped like a box, and the navigation board 107 is mounted to the navigation board holder 108. A navigation side connector 109 is mounted at the end of the navigation board 107. The navigation side connector 109 is a B to B (board to board) connector to be connected to a connector (LCD side connector 205 described later) provided at the display part 200.

Here, a description will be given to a positioning structure of the navigation board 107 (further, the navigation side connector 109) and the main body chassis 101.

As shown in FIG. 4, board positioning convex parts 110a and 110b are protrusively provided at the navigation board holder 108 united with the main body chassis 101, and screw holes 111a and 111b are opened adjacent thereto. In the navigation board 107 on one side, as shown in FIGS. 2 and 3, opened are board positioning concave parts 112a and 112b fitting the board positioning convex parts 110a and 110b, respectively, and adjacent screw holes 113a and 113b.

Then, when the navigation board 107 is mounted on the navigation board holder 108, the board positioning convex and concave parts 110a and 112a are fitted together, and also the board positioning convex and concave parts 110b and 112b are fitted together to thus position the two components. Subsequently, a screw 114a is fastened into the screw holes 111a and 113a adjacent to the fitting portion, and a screw 114b is fastened into the screw holes 111b and 113b to thus fix the two components. As a result, the navigation side connector 109 is positioned to the main body chassis 101.

Incidentally, in the illustrated example, two sets of board positioning convex and concave parts are provided, but three or more sets thereof may be provided. Also, the screw fastenings may be carried out at three or more places. Further, pawl fittings may be adopted in place of the screw fastenings.

The board positioning convex and concave parts 110a and 112a and the screw holes 111a and 113a, and the board positioning convex and concave parts 110b and 112b and the screw holes 111b and 113b are provided in proximity to each other, respectively, and also the board positioning convex and concave parts 110b and 112b and the screw holes 111b and 113b are provided in proximity to the navigation side connector 109; as a result, it is possible to enhance a positional precision of the navigation board 107 to the navigation board holder 108, and further a positional precision of the navigation side connector 109 to the navigation board holder 108.

Subsequently, a description will be given to a positioning structure of the main body chassis 101 with a display part chassis 203.

With the vehicle-mounted information apparatus, the main body chassis 101 and the display part chassis 203 described later are assembled to each other, to thereby integrate the device main body 100 and the display part 200.

To this end, positioning parts 115a and 115b are provided on both side faces 103 and 104 of the main body chassis 101 which are opposite to each other. One set of two positioning bosses 116 are provided for each of the positioning parts 115a and 115b (shown in FIG. 4). It is noted that in FIG. 4 only a pair of positioning bosses 116 are seen on the side face 104 side; however, a pair of positioning bosses 116 are also provided on the side face 103 side. Further, a screw hole 117 and a fitting pawl 118 are provided at a position interposed between the pair of positioning bosses 116 of each of the positioning parts 115a and 115b. These details will be described later.

Further, screw holes 119a and 119b (shown in FIGS. 2 and 3) are provided at the end portions of the sides of both the side faces 103 and 104 on which the positioning parts 115a and 115b are provided, respectively.

Incidentally, in the illustrated example, the positioning parts 115a and 115b are provided in both the side faces 103 and 104, respectively; however, these may be provided in a pair of opposing surfaces, and may be provided in the bottom face 102 and top face 106, respectively.

Next, a description will be given to a configuration of the display part 200.

Figure 5:
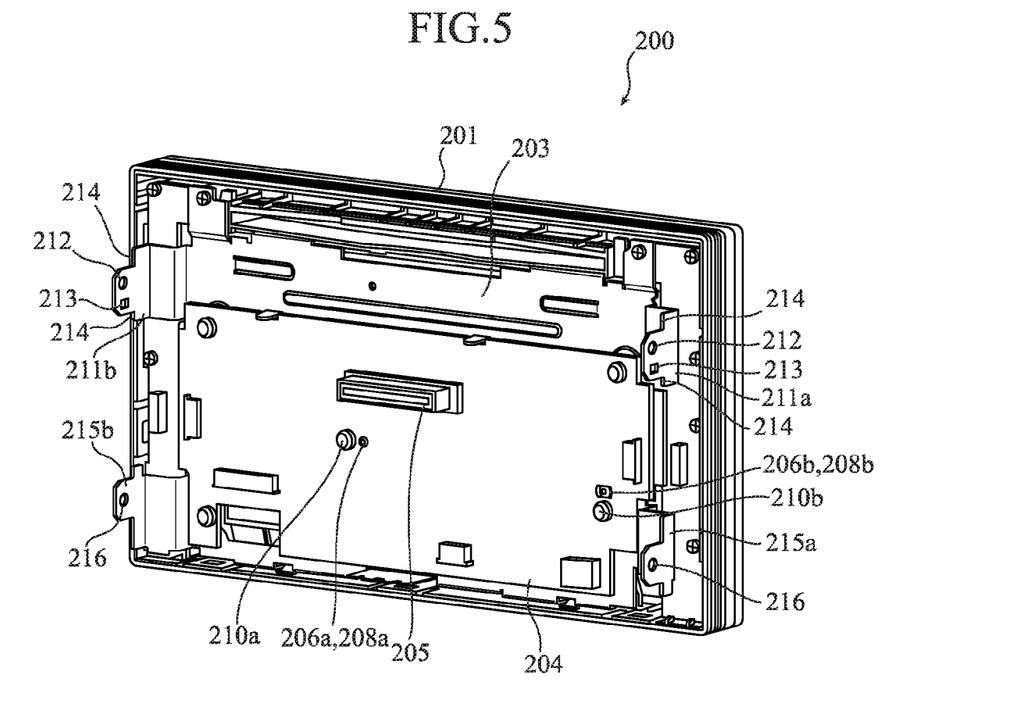
FIG. 5 is an external perspective view of a display part in accordance with Embodiment 1, and shows a state after assembly.
Figure 6:
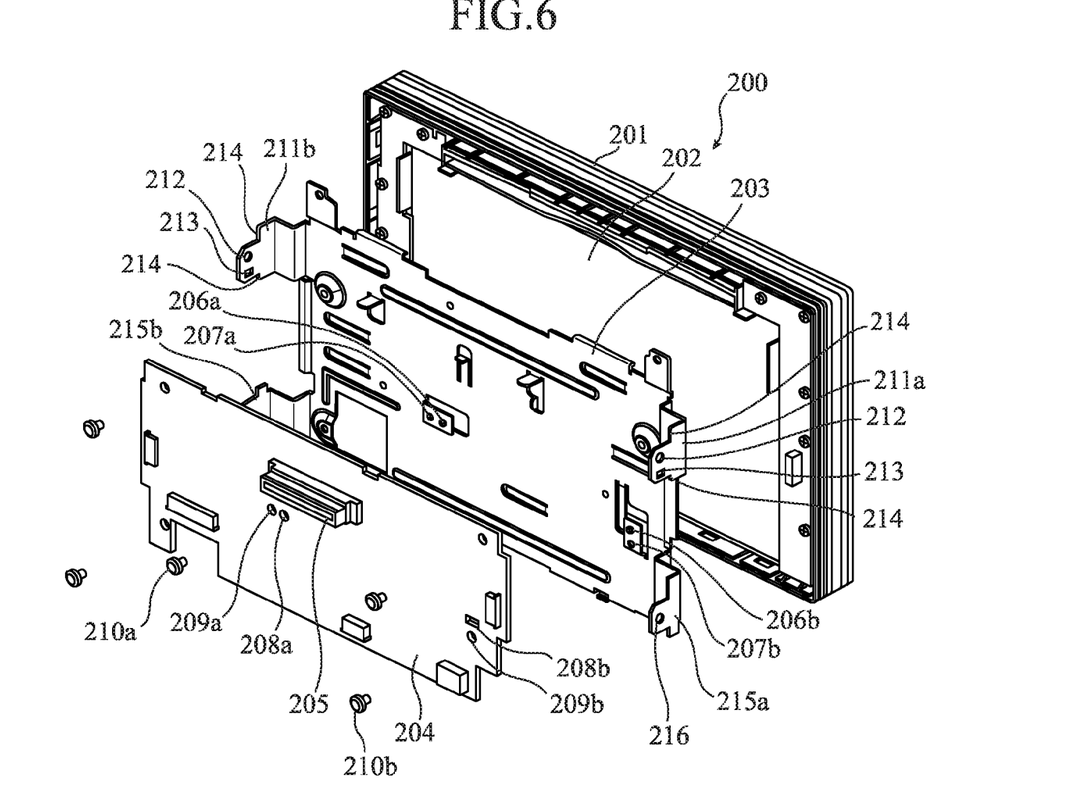
FIG. 6 is an external perspective view of the display part in accordance with Embodiment 1, and shows a state before assembly.
Figure 7:
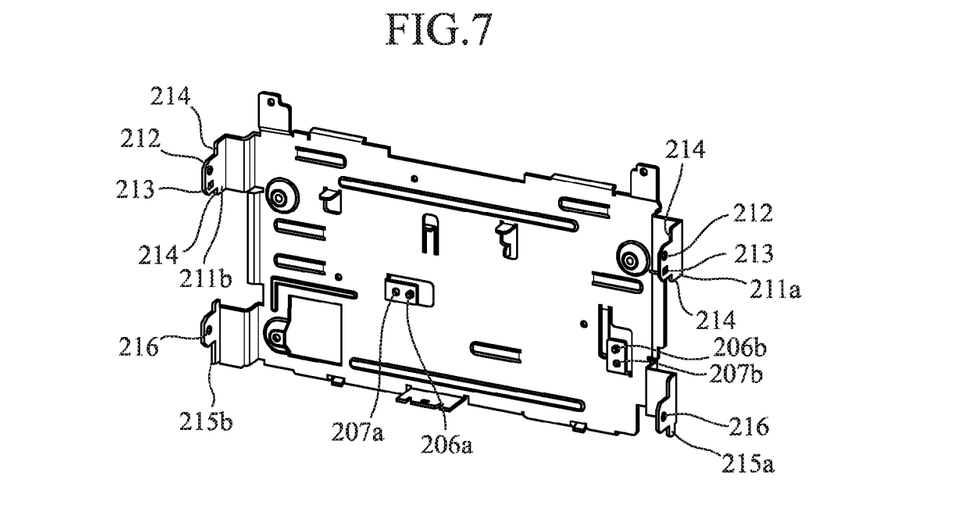
FIG. 7 is an external perspective view of a display part chassis in accordance with Embodiment 1.

FIGS. 5 and 6 are each an external perspective view showing a configuration of the display part 200: FIG. 5 shows a state after assembly; and FIG. 6 shows a state before assembly. FIG. 7 is an external perspective view of the display part chassis 203.

The display part 200 includes a design panel 201 of a resin member, an LCD 202, the display part chassis 203 of a sheet metal member, and an LCD board 204. When the display part chassis 203 is mounted on the main body chassis 101, the device main body 100 and the display part 200 are united with each other. The design panel 201 united with the LCD 202 is mounted on the front of the display part chassis 203, and the LCD board 204 is mounted at the back thereof. An LCD side connector 205 to be connected to the navigation side connector 109 on the device main body 100 side is mounted on the position of the surface of the LCD board 204 facing the device main body 100, corresponding to the vicinity of the center of the display part 200.

Here, a description will be given to a positioning structure of the LCD board 204 (further, the LCD side connector 205) and the display part chassis 203.

As shown in FIG. 7, board positioning convex parts 206a and 206b are protrusively provided on the display part chassis 203, and screw holes 207a and 207b are opened adjacent thereto. In the LCD board 204 on one side, as shown in FIGS. 5 and 6, opened are board positioning concave parts 208a and 208b fitting the board positioning convex parts 206a and 206b, respectively, and adjacent screw holes 209a and 209b.

Then, when the LCD board 204 is mounted on the display part chassis 203, the board positioning convex and concave parts 206a and 208a are fitted together, and the board positioning convex and concave parts 206b and 208b are fitted together to thus position the two components. Subsequently, a screw 210a is fastened to the screw holes 207a and 209a adjacent to the fitting portion, and also a screw 210b is fastened to the screw holes 207b and 209b to thus fix the two components. As a result, the LCD side connector 205 is positioned to the display part chassis 203.

Incidentally, in the illustrated example, the two sets of board positioning convex and concave parts are provided, but three or more sets may be provided. Also, the screw fastenings may be carried out at three or more places. Further, pawl fittings may be adopted in place of the screw fastenings.

The board positioning convex and concave parts 206a and 208a and the screw holes 207a and 209a, and the board positioning convex and concave parts 206b and 208b and the screw holes 207b and 209b are provided in proximity to each other, respectively, and also the board positioning convex and concave parts 206a and 208a and the screw holes 207a and 209a are provided in proximity to the LCD side connector 205; as a result, it is possible to enhance the position precision of the LCD board 204 to the display part chassis 203, and further the position precision of the LCD side connector 205 to the display part chassis 203.

Subsequently, a description will be given to a positioning structure of the display part chassis 203 with the main body chassis 101.

There are provided positioning protrusive pieces 211a and 211b protruding from both sides of the display part chassis 203 which are opposite to each other toward the main body chassis 101 side. In each of the positioning protrusive pieces 211a and 211b, there are provided a screw hole 212 and a fitting hole 213 to fit the fitting pawl 118 of the main body chassis 101. Further, both-shoulder portions 214 to be latched on the pair of positioning bosses 116 of the main body chassis 101 are formed at respective tip portions of the positioning protrusive pieces 211a and 211b.

Further, fixing protrusive pieces 215a and 215b are protrusively provided at the two sides of the display part chassis 203 at which the positioning protrusive pieces 211a and 211b are provided, and screw holes 216, 216 are provided therefor, respectively.

Incidentally, in the illustrated example, the positioning protrusive pieces 211a and 211b are provided on opposite-side sides of the display part chassis 203, but may be provided at the upper side and lower side thereof, and are acceptable so long as they are the positions opposed to the positioning parts 115a and 115b on the main body chassis 101 side, respectively.

Next, a description will be given to an assembly procedure of the device main body 100 and the display part 200.

Figure 8:
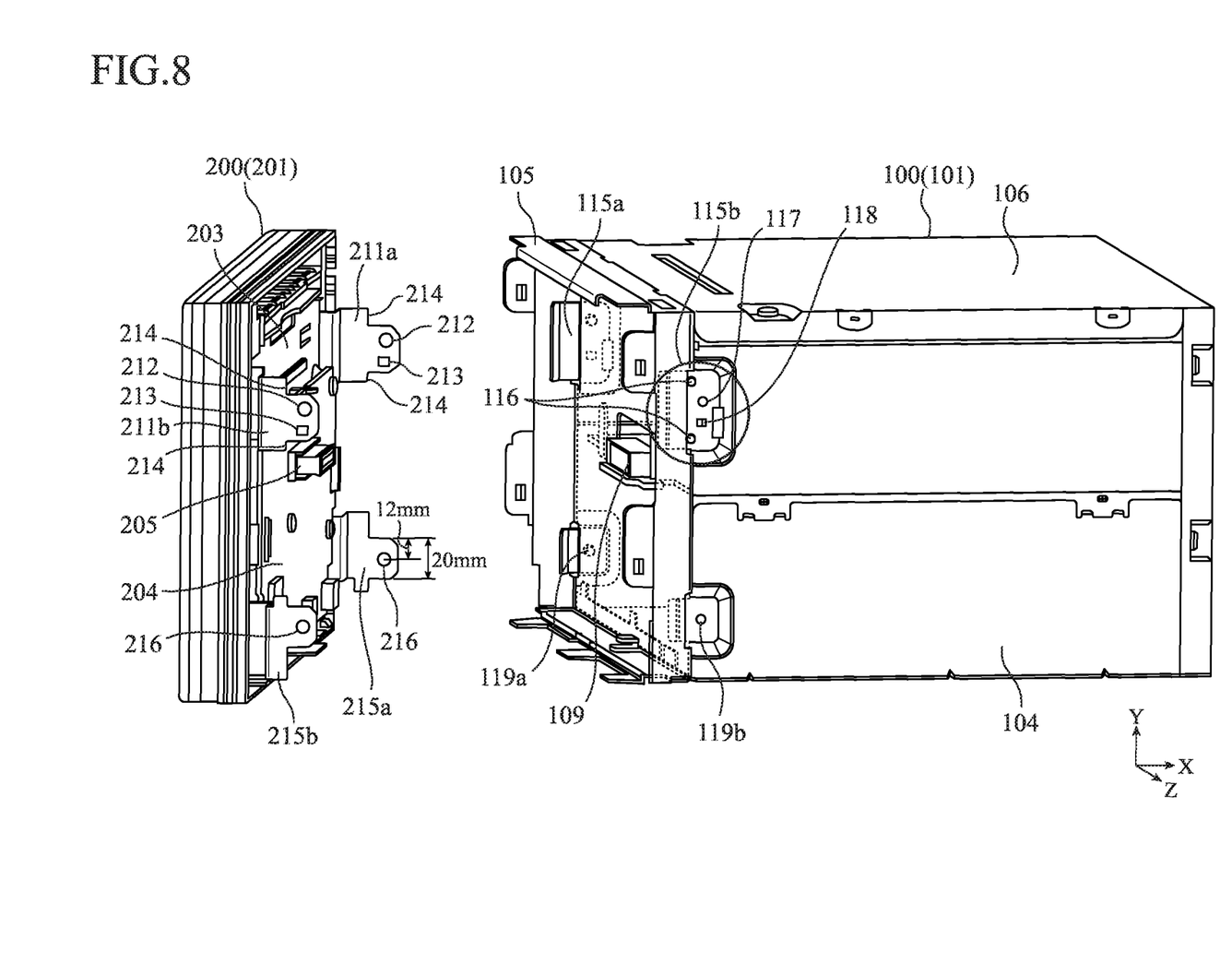
FIG. 8 is an external perspective view showing a state of the device main body and the display part before assembly.
Figure 9:
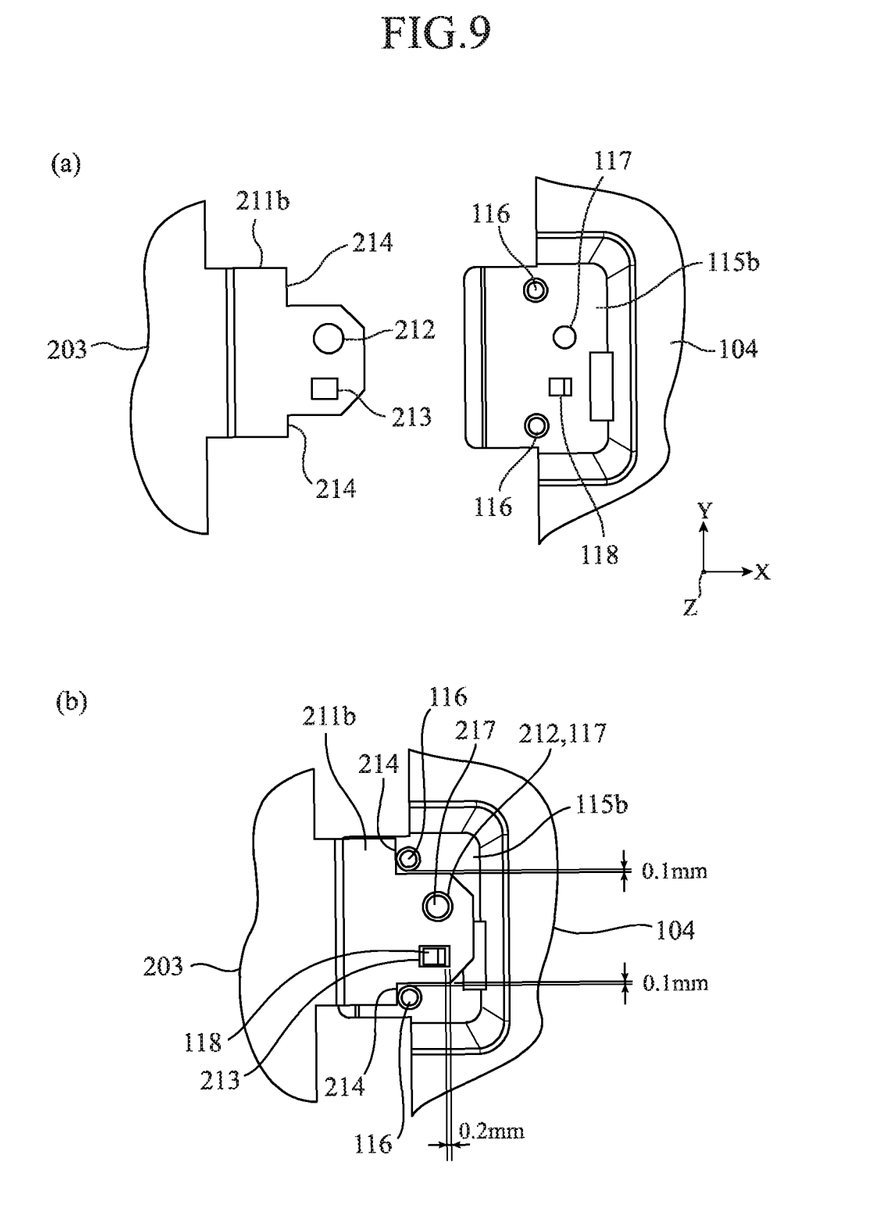

FIG. 8 is an external perspective view showing a state of the device main body 100 and the display part 200 before assembly. FIG. 9 illustrates an enlarged view of the positioning part 115b of the main body chassis 101 and the positioning protrusive piece 211b of the display part chassis 203: FIG. 9(a) shows a state thereof before assembly; and FIG. 9(b) shows a state thereof after assembly. It is noted that for the sake of simplification of description, X, Y, and Z axes are defined with respect to vehicle-mounted information apparatuses of FIGS. 8 and 9.

As the assembly procedure, first, the device main body 100 and the display part 200 are each assembled to be put in the state of FIG. 8; subsequently, a positioning is carried out in such a manner that the display part chassis 203 is fitted into the front face 105 of the main body chassis 101; upon completion of the positioning, the navigation side connector 109 and the LCD side connector 205 are automatically connected to each other; thus, as the condition is maintained, two screws 217 and two screws 218 are fastened thereto, respectively, to thereby fix the main body chassis 101 and the display part chassis 203 as shown in FIG. 9.

Incidentally, appropriate gaps are provided between the front face 105 of the main body chassis 101 and the two side faces 103 and 104, respectively; the positioning protrusive pieces 211a and 211b and the fixing protrusive pieces 215a and 215b are inserted into the gaps, respectively, to be abutted against the main body chassis 101 side.

Hereinafter, a positioning between the main body chassis 101 and the display part chassis 203 will be described with reference to FIG. 9.

(1) Positioning in X Axis Direction

Upon assembly of the device main body 100 and the display part 200, at the side face 104 of the main body chassis 101, the positioning protrusive piece 211b is inserted into between the pair of the positioning bosses 116 of the positioning part 115b, and the both-shoulder portions 214 are abutted against the pair of positioning bosses 116. When the positioning bosses 116 are latched on the both-shoulder portions 214, the main body chassis 101 and the display part chassis 203 are positioned in the X axis direction.

Incidentally, the positioning part 115a and the positioning protrusive piece 211a on the opposite side are also positioned in the X axis direction in the same manner, as the illustration is omitted in FIG. 9.

(2) Positioning in the Y Axis Direction

Since there arises a state such that the tip portion of the positioning protrusive piece 211b is sandwached between the pair of positioning bosses 116 of the positioning part 115b, the main body chassis 101 and the display part chassis 203 are positioned with each other in the Y axis direction.

However, since the positioning protrusive piece 211b becomes less likely to be inserted into between the positioning bosses 116 depending on finished dimensions of the components, it is necessary to provide a given clearance (0.1 mm for each in the example of FIG. 9(b)) for each between the positioning protrusive piece 211b and the positioning bosses 116.

Incidentally, the positioning part 115a and the positioning protrusive piece 211a on the opposite side are also positioned in the Y axis direction in the same manner, as the illustration is omitted in FIG. 9.

(3) Positioning in the Z Axis Direction

When the positioning protrusive piece 211b is inserted into between the pair of positioning bosses 116, the positioning protrusive piece 211b is abutted against the outer wall surface of the positioning part 115b; thus, there arises a state such that the pair of positioning protrusive pieces 211a and 211b are clutched by the side faces 103 and 104, and hence the main body chassis 101 and the display part chassis 203 are positioned in the Z axis direction.

However, when the positioning protrusive pieces 211a and 211b are abutted against the outer wall surface of the side face 103 and the outer wall surface of the side face 104, respectively, it becomes impossible to achieve the assembly depending on the finished dimensions of the components; thus, it is necessary to provide a given clearance (e.g., 0.2 mm) in the Z axis direction at any one of between the side face 103 and the positioning protrusive piece 211a, or between the side face 104 and the positioning protrusive piece 211b. Even when the clearance is provided, the tip portion is fixed with bent from the both-shoulder portions 214 of the positioning protrusive piece 211a or 211b, when the screw 217 is fastened to the screw holes 117 and 212; thus, there is no occurrence of a misalignment.

It is noted that when the positioning protrusive piece 211b is inserted into between the pair of positioning bosses 116, the fitting pawl 118 and the fitting hole 213 are fit in with each other, and provisionally fixed to each other in a positioned state, to thereby prevent a misalignment. A given clearance (in the example of FIG. 9(b), 0.2 mm) is provided at the fitting portion so as to prevent the fitting hole 213 from running on the fitting pawl 118 without fitting in therewith. Further, the fitting between the fitting pawl 118 and the fitting hole 213 can also prevent the main body chassis 101 and the display part chassis 203 from being pushed back by a reaction force between the navigation side connector 109 and the LCD side connector 205.

In a state where the main body chassis 101 and the display part chassis 203 are positioned and provisionally fixed, the screw 217 is first fastened to the screw holes 117 and 212 on the side of the positioned side face to keep the position precision. Subsequently, the screw 217 is also fastened into the screw holes 117 and 212 on the opposite surface side provided with the clearance.

Further subsequently, screw holes 216 and 216 of the fixing protrusive pieces 215a and 215b are respectively abutted against screw holes 119a and 119b of the main body chassis 101, and the screws 218, 218 are fastened thereto, respectively. In order to prevent positionings at the portions of the fixing protrusive pieces 215a and 215b, a clearance of about 0.2 mm is provided for each between the side face 103 and the fixing protrusive piece 215a, and between the side face 104 and the fixing protrusive piece 215b; thus, the tip portions of the fixing protrusive pieces 215a and 215b are bent upon fastening of the screws 218. In the example of FIG. 8, in order for the tip portion to have a rigidity to a extent that is bent by 0.2 mm, the width of the tip portion of the fixing protrusive piece 215a is set at 20 mm, and a distance between the end of the tip portion and the center of the screw hole 216 is set at 12 mm. The same also applies to the fixing protrusive piece 215b.

Additionally, since the screw fixing of the main body chassis 101 and the display part chassis 203 is also performed by the positioning protrusive pieces 211a and 211b, the screw fixing of the fixing protrusive pieces 215a and 215b may be omitted if the strength and so on can be ensured. Also, pawl fittings may be adopted, in place of the screw fixing of the positioning protrusive pieces 211a and 211b and the screw fixing of the fixing protrusive pieces 215a and 215b.

As described above, since the positioning and fixing are carried out by the main body chassis 101 and the display part chassis 203 fixing thereon the navigation board 107 and the LCD board 204 on which the navigation side connector 109 and the LCD side connector 205 are mounted, respectively, the related components can be minimized to thereby reduce the effect of the finished dimensions of the components.

Therefore, it is possible to enhance a positional precision between the navigation side connector 109 and the LCD side connector 205.

Further, as mentioned above, by the fitting of the board positioning convex and concave parts 110b and 112b, the navigation side connector 109 is positioned to the main body chassis 101 with high precision, and by fitting of the board positioning convex and concave parts 206a and 208a, the LCD side connector 205 is positioned to the display part chassis 203 with high precision; thus, by the positioning and fixing of the main body chassis 101 and the display part chassis 203, it is also possible to enhance the positional precision between the navigation side connector 109 and the LCD side connector 205.

With these configuration, the B to B connector with a larger number of pins and a narrowed movable region can be employed for the navigation side connector 109 and the LCD side connector 205. Since the number of pins can be increased, the necessity of ensuring the number of pins with a plurality of connectors as in the conventional is eliminated, and hence a space saving thereof can be achieved. Further, a complicated handling such as routing of wires like FFC and FPC becomes unnecessary, thereby enhancing assemblability thereof.

Further, since the positional precision of the main body chassis 101 and the navigation side connector 109 is high, and the positional precision of the display part chassis 203 and the LCD side connector 205 is also high, a provisional fixing of the main body chassis 101 and the display part chassis 203 leads to the completion of a connection between the navigation side connector 109 and the LCD side connector 205. Therefore, if it is confirmed that the fitting pawl 118 and the fitting hole 213 fit each other, it can be presumed that the connector connection is completed.

In contrast, conventionally, since it is necessary to visually confirm the connector connection, it is obliged to open a hole for visual confirmation in the outer wall of the chassis, and also mount a connector in the vicinity of the outer wall of the chassis.

Further, conventionally, it is configured such that the design panel 201 of a resin member is fixed to the main body chassis 101 of a sheet metal member. However, in the present Embodiment 1, since it is configured such that the display part chassis 203 and the main body chassis 101 of a sheet metal member are fixed, it is also possible to establish a ground by a coupling between the chassis.

When the vehicle-mounted information apparatus is disassembled, the display part 200 is removed in such a manner as to be peeled off from the side face 103 (or the side face 104) of the device main body 100. In the case, it is feared that a load is imposed on a connection portion between the navigation side connector 109 and the LCD side connector 205; however, as shown in FIG. 8, when the navigation side connector 109 is mounted in the vicinity of the center of the front face 105, and also the LCD side connector 205 is mounted in the vicinity of the center of the display part chassis 203, the tilt is minimized in the vicinity of the center relative to in the vicinity of the chassis outer wall, so that the load can be controlled to a minimum. As a result, it is possible to control breakage risk of the connectors upon disassembly to a minimum.

In contrast, since the connectors are conventionally obliged to be mounted in the vicinity of the chassis outer wall as mentioned above, the breakage risk is high.

As described above, the vehicle-mounted information apparatus in accordance with Embodiment 1 is configured to include: the box-like main body chassis 101; the navigation board 107 positioned and fixed by providing the board positioning convex and concave parts 110 and 112 inside the main body chassis 101 (navigation board holder 108); the plate-like display part chassis 203 covering the front face 105 of the main body chassis 101; the LCD board 204 positioned and fixed by providing the board positioning convex and concave parts 206 and 208 at the surface of the display part chassis 203 facing the main body chassis 101; the navigation side connector 109 and the LCD side connector 205 mounted respectively at the positions of the navigation board 107 and the LCD board 204 to face each other when the main body chassis 101 and the display part chassis 203 are put in an assembled state; two positioning bosses 116 provided protrusively on each of both side faces 103 and 104 of the main body chassis 101; a pair of positioning protrusive pieces 211a and 211b protruding respectively from the pair of opposing side parts of the display part chassis 203 toward the main body chassis 101 side, such that the pieces are abutted against the positioning parts 115a and 115b, respectively, and also that corresponding protruding tip portions thereof are each inserted between the two positioning bosses 116 of the positioning part, so that the both-shoulder portions 214 formed at the corresponding protruding tip portions thereof are latched on the two positioning bosses 116, thereby performing the positioning of the main body chassis 101 and the display part chassis 203; and the screw holes 117 and 212, and the screw 217 for fixing the positioning protrusive pieces 211a and 211b to the positioning parts 115a and 115b, respectively. For this reason, it is possible to minimize the number of interposed components, which can reduce the effect of the finished dimensions of the components to thereby improve the assembly precision between the chassis. As a result, the B to B connector with a large number of pins and a narrow movable region can be employed for the navigation board 107 and the LCD side connector 205, to thus achieve enhancement of assemblability and space saving thereof.

Further, in accordance with Embodiment 1, it is configured such that the positioning protrusive pieces 211a and 211b of a sheet metal member connected with the ground of the LCD board 204 are abutted against and electrically connected with the positioning parts 115a and 115b of a sheet metal member connected with the ground of the navigation board 107, and hence it becomes possible to establish a ground for the LCD board 204 without using another component.

Further, in accordance with Embodiment 1, it is configured to include: the fitting pawls 118 provided respectively at the positioning parts 115a and 115b; and the fitting holes 213 provided in the positioning protrusive pieces 211a and 211b to fit the fitting pawls 118, when the main body chassis 101 and the display part chassis 203 are positioned with each other, and the navigation side connector 109 and the LCD side connector 205 are put at mutually connected positions, and hence the necessity of visually checking whether the connectors are connected to each other or not through a chassis hole is eliminated. Therefore, a restriction in the arrangement of the connectors is eliminated, which enables the arrangement thereof in the vicinity of the apparatus. With this configuration, even when the display part chassis 203 is removed at an angle to the main body chassis 101 in apparatus disassembly, the load of the connectors to the pins can be reduced.

Incidentally, according to the present invention, within the scope of the invention, any components in the embodiments can be modified or any components in the embodiments can be omitted.

INDUSTRIAL APPLICABILITY

As described above, in accordance with the vehicle-mounted information apparatus of the present invention, precision in assembly thereof is enhanced in such a manner that the chassis each fixing a connector-mounted board thereto are positioned and fixed to each other, and hence the B to B connectors become available; thus, it is suitable for use in an in-vehicle device of a car navigation device, a car audio device, and so on, such that a transmission amount of information between the circuit boards is large, and that a space saving thereof is required.

EXPLANATION OF REFERENCE NUMERALS

100: Device main body, 101: Main body chassis (first chassis), 102: Bottom face, 103 and 104: Side face, 105: Front face, 106: Top face, 107: Navigation board (first circuit board), 108: Navigation board holder (first chassis), 109: Navigation side connector (board to board connector), 110a and 110b: Board positioning convex part, 111a, 111b, 113a, and 113b: Screw hole, 112a and 112b: Board positioning concave part, 114a and 114b: Screw, 115a and 115b: Positioning part, 116: a pair of positioning bosses, 117, 119a, 119b: Screw hole (fixing part), 118: Fitting pawl, 200: Display part, 201: Design panel, 202: LCD, 203: Display part chassis (second chassis), 204: LCD board (second circuit board), 205: LCD side connector (board to board connector), 206a and 206b: Board positioning convex part, 207a, 207b, 209a, and 209b: Screw hole, 208a and 209b: Board positioning concave part, 210a and 210b: Screw, 211a and 211b: Positioning protrusive piece, 212 and 216: Screw hole (fixing part), 213: Fitting hole, 214: Both-shoulder portion, 215a and 215b: Fixing protrusive piece, 217 and 218: Screw (fixing part).

The invention claimed is:

1. A vehicle-mounted information apparatus, comprising:
a first chassis shaped like a box;
a first circuit board positioned and fixed inside the first chassis;
a second chassis shaped like a plate which is an internal component of a design panel that covers one surface of the first chassis, and which is secured to the first chassis;
a second circuit board positioned and fixed at a surface of the second chassis facing the first chassis;
a pair of board-to-board connectors mounted respectively at positions of the first circuit board and the second circuit board to face each other, when the first chassis and the second chassis are put in an assembled state;
two bosses arranged protrusively on each of a pair of opposing outer wall surfaces of the first chassis;
a pair of protrusive pieces protruding respectively from a pair of opposing side parts of the second chassis toward the first chassis side, such that the pieces are abutted against a pair of opposing outer wall surfaces of the first chassis, respectively, and also that corresponding protruding tip portions thereof are each inserted between the two bosses, so that both-shoulder portions formed at the corresponding protruding tip portion are latched on the two bosses, thereby performing a positioning between the first chassis and the second chassis; and
a fixing part for fixing the protrusive pieces of the second chassis to the outer wall surfaces of the first chassis.

2. The vehicle-mounted information apparatus according to claim 1, wherein the protrusive piece of the second chassis of a sheet metal member connected with a ground of the second circuit board is abutted against and is electrically connected with the outer wall surface of the first chassis of a sheet metal member connected with a ground of the first circuit board to thus establish a common ground for the first chassis and the second chassis.

3. The vehicle-mounted information apparatus according to claim 1, comprising:
- a fitting pawl provided the outer wall surface of the first chassis against which the corresponding protrusive piece of the second chassis is abutted; and
- a fitting hole provided in the corresponding protrusive piece to fit the fitting pawl, when the first chassis and the second chassis are positioned with each other, and the pair of board-to-board connectors are put at mutually connected positions, to thus grasp a positional relationship between the pair of board-to-board connectors by a fitting between the fitting pawl and the fitting hole.

\* \* \* \* \*